US008359589B2

(12) United States Patent
Arimilli et al.

(10) Patent No.: US 8,359,589 B2
(45) Date of Patent: Jan. 22, 2013

(54) HELPER THREAD FOR PRE-FETCHING DATA

(75) Inventors: Ravi K. Arimilli, Austin, TX (US); Juan C. Rubio, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1380 days.

(21) Appl. No.: 12/024,191

(22) Filed: Feb. 1, 2008

(65) Prior Publication Data

US 2009/0199170 A1   Aug. 6, 2009

(51) Int. Cl.
*G06F 9/44* (2006.01)
*G06F 9/45* (2006.01)
*G06F 15/167* (2006.01)
*G06F 9/30* (2006.01)
*G06F 9/46* (2006.01)

(52) U.S. Cl. ........ 717/162; 717/140; 717/151; 717/158; 709/214; 712/214; 712/235; 718/107

(58) Field of Classification Search .................. None
See application file for complete search history.

(56) References Cited

U.S. PATENT DOCUMENTS

| | | | |
|---|---|---|---|
| 5,933,627 A | 8/1999 | Parady | |
| 7,404,067 B2 * | 7/2008 | Aamodt et al. | 712/228 |
| 7,814,469 B2 * | 10/2010 | Wang et al. | 717/151 |
| 8,095,920 B2 * | 1/2012 | Liao et al. | 717/140 |
| 2003/0233394 A1 | 12/2003 | Rudd et al. | |
| 2004/0054990 A1 * | 3/2004 | Liao et al. | 717/162 |
| 2004/0154011 A1 * | 8/2004 | Wang et al. | 717/158 |
| 2004/0154012 A1 * | 8/2004 | Wang et al. | 717/158 |
| 2004/0216102 A1 | 10/2004 | Floyd | |
| 2005/0071438 A1 * | 3/2005 | Liao et al. | 709/214 |
| 2005/0071841 A1 * | 3/2005 | Hoflehner et al. | 718/100 |
| 2005/0086652 A1 * | 4/2005 | Tian et al. | 717/151 |
| 2005/0223199 A1 | 10/2005 | Grochowski et al. | |
| 2005/0278487 A1 | 12/2005 | Blandy | |
| 2006/0155963 A1 * | 7/2006 | Bohrer et al. | 712/214 |
| 2007/0022412 A1 * | 1/2007 | Tirumalai et al. | 717/140 |
| 2007/0022422 A1 * | 1/2007 | Tirumalai et al. | 718/100 |
| 2007/0088915 A1 | 4/2007 | Archambault et al. | |
| 2007/0226465 A1 | 9/2007 | Chaudhry et al. | |
| 2007/0271565 A1 * | 11/2007 | Tirumalai et al. | 718/100 |
| 2008/0141268 A1 * | 6/2008 | Tirumalai et al. | 718/107 |

OTHER PUBLICATIONS

Jiwei Lu, Dynamic Helper Threaded Prefetching on the Sun UltraSPARC CMP Processor [online], 2005,[retrieved on Aug. 16, 2011]. Retreived from the internet: <URL: http://ieeexplore.ieee.org/stamp/stamp.jsp?tp=&arnumber=1540951?>. pp. 1-12.*

(Continued)

*Primary Examiner* — Don Wong
*Assistant Examiner* — Anibal Rivera
(74) *Attorney, Agent, or Firm* — Yudell Isidore Ng Russell PLLC

(57) ABSTRACT

A set of helper thread binaries is created to retrieve data used by a set of main thread binaries. If executing a portion of the set of helper thread binaries results in the retrieval of data needed by the set of main thread binaries, then that retrieved data is utilized by the set of main thread binaries.

18 Claims, 6 Drawing Sheets

OTHER PUBLICATIONS

Dongkeun Kim et al., Physical Experimentation with Prefetching Helper Threads on Intel's Hyper-Threaded Processors, 2004 IEEE, 0-7695-2102-9/04, [Retrieved on Aug. 20, 2012]. Retrieved from the internet: <URL: http://ieeexplore.ieee.org/stamp/stamp.jsp?tp=&arnumber=1281661> 12 Pages (1-12).*

Jiwei Lu et al., Dynamic Helper Threaded Prefetching on the Sun UltraSPARC CMP Processor, 2005 IEEE, 0-7695-2440-0/05, [Retrieved on Aug. 20, 2012]. Retrieved from the internet: <URL: http://ieeexplore.ieee.org/stamp/stamp.jsp?tp=&arnumber=1540951> 12 Pages (1-12).*

Perry H. Wang et al., Helper Threads via Virtual Multithreading on an Experimental Itanium 2 Processor-based Platform, ACM SOGOPS vol. 38 Issue 5, Dec. 2004, [Retrieved on Aug. 20, 2012]. Retrieved from the internet: <URL: http://dl.acm.org/citation.cfm?id=1024411> 12 Pages (144-155).*

Galvin, et al., "Operating System Concepts," Addison-Wesley Publishing Company, 4th Ed. 1995, pp. 111-116.

Arimilli, et al., "General Purpose Register Cloning," U.S. Appl. No. 12/024,198, Office Action dated Mar. 9, 2011.

Arimilli et al., "Thread Partitioning in a Multi-Core Environment," U.S. Appl. No. 12/024,211, Office Action dated Mar. 22, 2011.

Aamodt, T. et al, "A Framework for Modeling and Optimization of Prescient Instruction Prefetch," SIGMETRICS'03, Jun. 10-14, 2003, San Diego, California, USA, pp. 13-24.

Wang, P. et al, "Helper Threads Via Virtual Multithreading on an Experimental Itanium 2 Processor-Based Platform," ASPLOS'04, Oct. 9-13, 2004, Boston, Massachusetts, USA, pp. 144-155.

Aamodt, T. et al, "Optimization of Data Prefetch Helper Threads With Path-Expression Based Statistical Modeling," ICS'07, Jun. 18-20, 2007, Seattle, Washington, USA, pp. 210-221.

Shayetesh, A. et al, "Improving the Performance and Power Efficiency of Shared Helpers in CMPs," Cases'06, Oct. 23-25, 2006, Seoul, Korea, pp. 345-356.

Lu, J. et al, "Dynamic Helper Threaded Prefetching on the Sun UltraSPARC CMP Processor," Proceedings of the 38th Annual IEEE/ACM International Symposium on Microarchitecture (MICRO'05), 2005, pp. 1-12.

Ku, W. et al, "Collaborative Multithreading: An Open Scalable Processor Architecture for Embedded Multimedia Applcations," ICME 2006, pp. 25-28.

Kim, D. et al, "Design and Evaluation of Compiler Algorithms for Pre-Execution," ASPLOS X, Oct. 2002, San Jose, California, USA, pp. 159-170.

Choi, S. et al, "A General Framework for Prefetch Scheduling in Linked Data Structures and Its Application to Multi-Chain Prefetching," ACM Transactions on Computer Systems, vol. 22, No. 2, May 2004, pp. 214-280.

Kim, D. et al, "A Study of Source-Level Compiler Algorithms for Automatic Construction of Pre-Execution Code," ACM Transactions on Computer Systems, vol. 22, No. 3, Aug. 2004, pp. 326-379.

* cited by examiner

HELPER THREAD FOR PRE-FETCHING DATA

This invention was made with United States Government support under Agreement No. HR0011-07-9-0002 awarded by DARPA. The Government has certain rights in the invention.

BACKGROUND OF THE INVENTION

1. Technical Field

The present invention relates in general to computers, and in particular to computer software. Still more particularly, the present invention relates to a system, method and computer program product for pre-fetching data for a main thread through the use of a helper thread.

2. Description of the Related Art

A computer can be viewed, in a simple perspective, as a set of hardware that manipulates data by executing instructions from an application, all under the control of an operating system. The application is a collection of all software needed to perform a task from a user's point of view. This includes the main thread(s) of executable binaries derived from the main thread. The executable binaries are groups of instructions that are loaded into execution units and other logic in a processor core in the computer.

When a user decides to run an application, the operating system loads the executable binaries into a region of memory, called the "code space." An instruction fetch unit then starts executing code, from the code space, to manipulate data from local registers and/or data caches. To optimize execution efficiency, the data to be manipulated needs to be readily available in the processor core.

SUMMARY OF THE INVENTION

A set of helper thread binaries is created to retrieve data used by a set of main thread binaries. If executing a portion of the set of helper thread binaries results in the retrieval of data needed by the set of main thread binaries, then that retrieved data is utilized by the set of main thread binaries.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
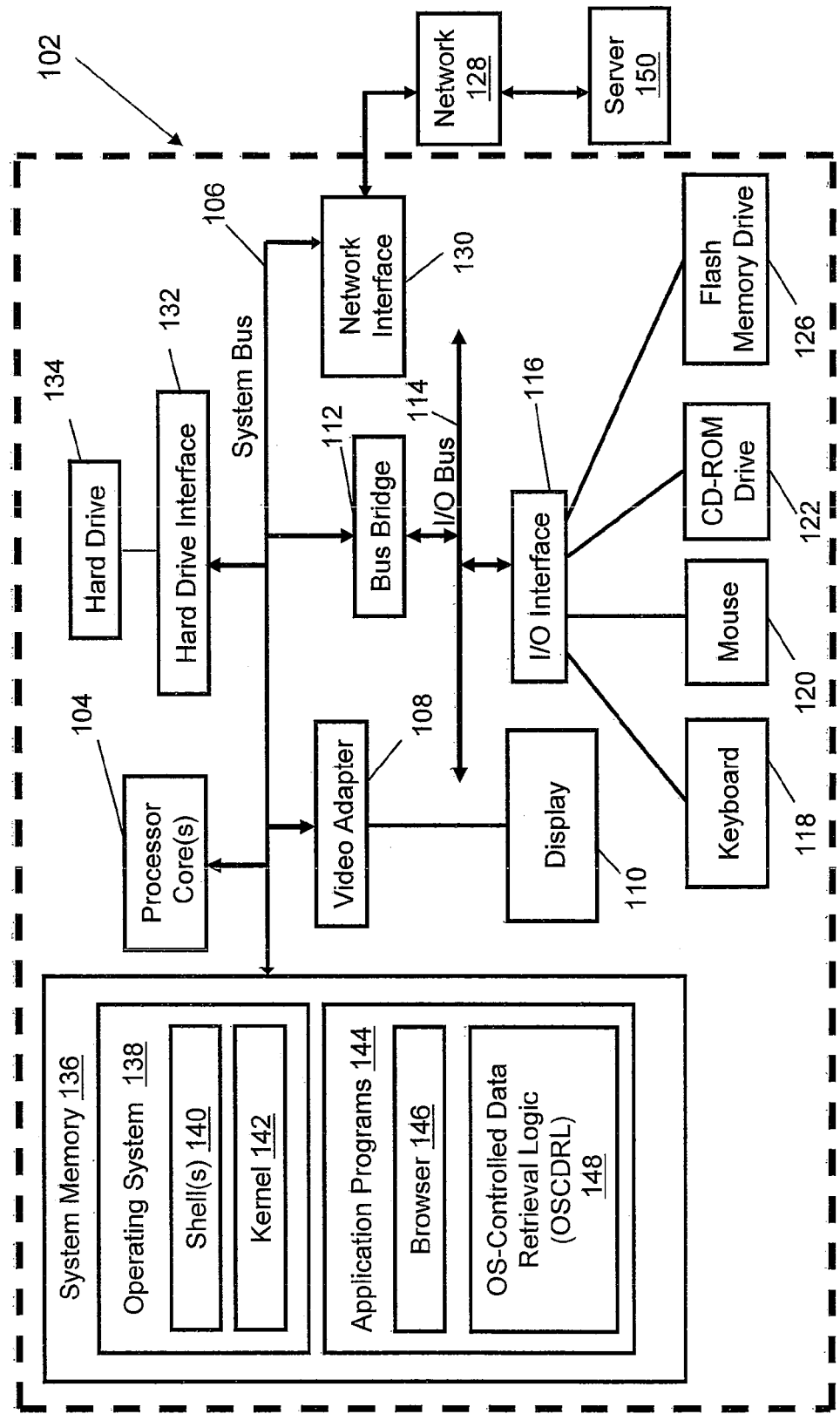
FIG. 1 is a block diagram of a data processing system in which the present invention may be implemented.

With reference now to FIG. 1, there is depicted a block diagram of an exemplary computer 102 in which the present invention may be implemented. Computer 102 includes one or more processor cores 104 that are coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Note the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which provides lower levels of functionality to the OS 138 and application programs 144, including memory management, process and task management, disk management, network management, power management and mouse and keyboard management.

Application programs 144 include a browser 146. Browser 146 includes program modules and instructions enabling a World Wide Web (WWW) client (i.e., computer 102) to send and receive network messages to the Internet using Hyper- Text Transfer Protocol (HTTP) messaging, thus enabling communication with software deploying server 150.

Application programs 144 in computer 102's system memory (as well as in software deploying server 150's system memory) also include an Operating-System Controlled Data Retrieving Logic (OSCDRL) 148. OSCDRL 148 includes code for implementing the processes described in FIGS. 4-6. In one embodiment, computer 102 is able to download OSCDRL 148 from software deploying server 150, including in an "on demand" basis, as described in greater detail below in FIGS. 4-6.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
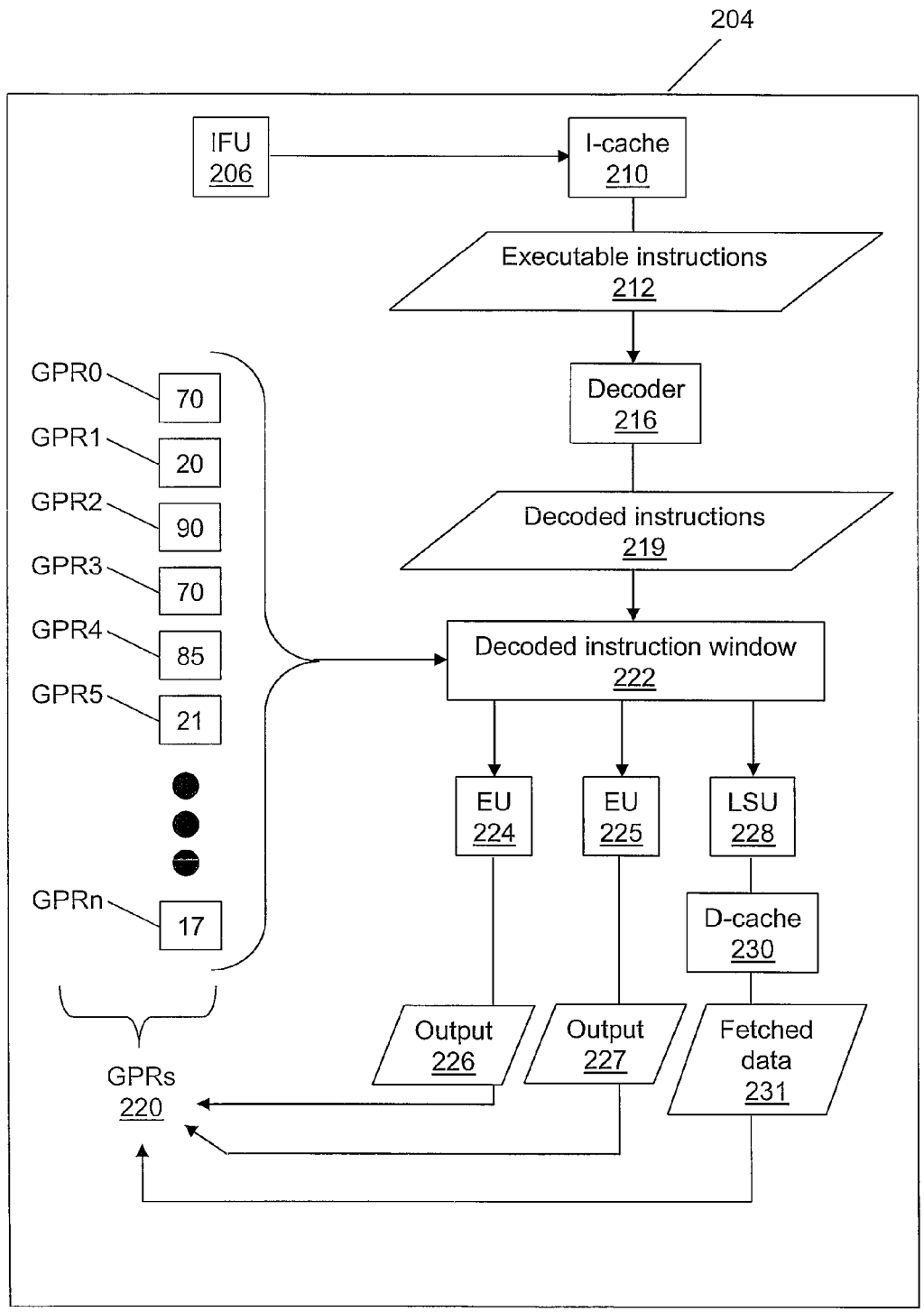
FIG. 2 depicts additional detail of a processor core used by the data processing system shown in FIG. 1.

With reference now to FIG. 2, additional detail of a processor core 204 (an example of one of the one or more processor cores 104 depicted in FIG. 1) is presented. Note that processor core 204 has other features and components beyond those depicted in FIG. 2. While such other features and components are known to those skilled in the art of computer architecture design, depicting these other features and components is not necessary to understand the operation of the present invention, and thus such features and components are omitted for the sake of clarity.

Processor core 204 includes an Instruction Fetch Unit (IFU) 206, which fetches a next instruction from an instruction cache (I-cache) 210. It is to be understood that an instruction is code that, after being decoded in a manner such as that described below, is executable by an execution unit in a core. That is, source code is compiled to create object code; object code is linked by a linker to create binaries; and binaries are used by a decoder to control the operation of an execution unit within the processor core 204. If I-cache 210 does not contain the requisite instructions, then those needed instructions are retrieved from lower levels of cache and/or system memory.

Thus, I-cache 210 sends instructions 212, which have been identified by the IFU 206, to an instruction decoder 216. The instruction decoder 216 determines what actions need to occur during the execution of the instructions 212, as well as which General Purpose Registers (GPR) 220 hold needed data. The GPRs 220, are depicted as GPR0 through GPRn, where "n" is an integer (e.g., n=31). In the example shown, GPR0 contains the value "70" while GPR1 contains the value "20", etc. The decoded instructions 219 and data from the GPRs 220 are buffered in a decoded instruction window 222, while they await previous operations to complete and results to become available. Once the inputs for the instruction in the decoded instruction window 222 become available they are sent to an Execution Unit (EU) 224. EU 224 may be a Fixed Point Execution Unit (FXU), a Floating Point Execution Unit (FPU), a Branch Execution Unit (BXU), or any other similar type of execution unit found in a processor core.

After executing the decoded instruction 222, the EU 224 sends the resultant output 226 into a particular GPR in the GPRs 220. The value of a GPR can also be sent to a Load/Store Unit (LSU) 228, which stores that value into a data cache (D-cache) 230.

In one embodiment, processor core 204 has multiple execution units, including EU 224 and EU 225. While the main thread binaries and helper thread binaries described herein may utilize a common IFU 206, Decoder 216, GPRs 220, LSU 228, and/or D-cache 230, the output 226 from EU 224 may be from execution of the main thread binaries, while the output 227 from EU 225 may be from execution of the helper thread binaries.

Figure 3:
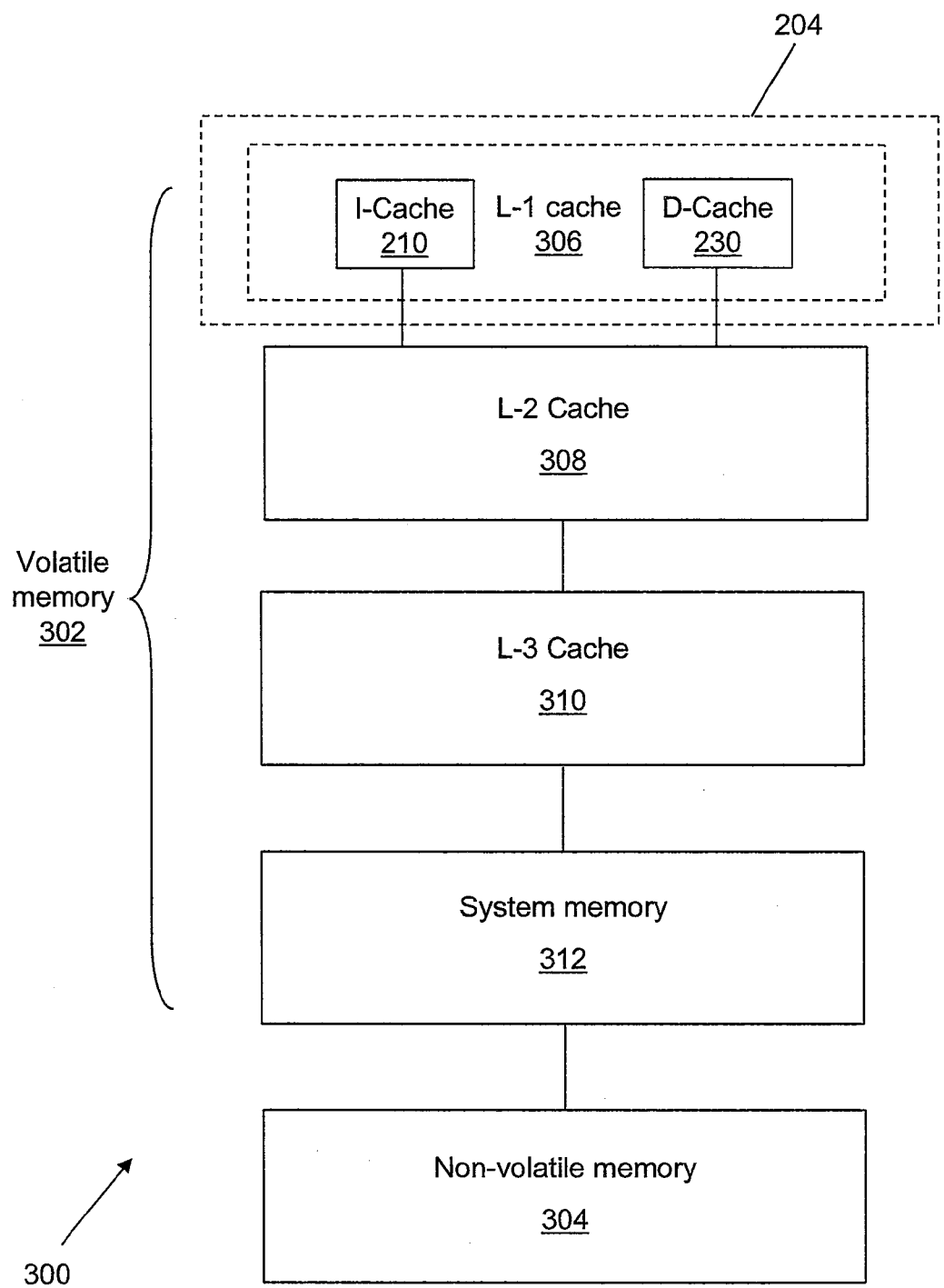
FIG. 3 illustrates a memory hierarchy used in the present invention.

With reference now to FIG. 3, a memory hierarchy 300 as utilized by the present invention is illustrated. Memory hierarchy 300 includes volatile memory 302 (memory that loses data when power is turned off) and non-volatile memory 304 (memory that is stored on a permanent medium that retains the data even after power is turned off). Within processor core 204 are level-one (L-1) cache 306, which includes I-cache 210 and D-cache 230 depicted in FIG. 2. In one embodiment, level-two (L-2) cache 308 and level-three (L-3) cache 310, as well as system memory 312 and non-volatile memory 304, are outside of processor core 204. In another embodiment, however, L-2 cache 308 and L-3 cache 310 are part of processor core 204. While the highest level of cache (L-1 cache 306) is the "fastest" (requiring only one or two clock cycles to retrieve data), L-1 cache 306 is also the smallest. Thus, if data is not within the L-1 cache 306, then that data must be pulled from the L-2 cache 308 (which is larger than the L-1 cache 306, but requires an order of magnitude more clock cycles to retrieve the needed data). Similarly, the L-3 cache 310 is yet larger and slower than the L-2 cache 308, the system memory 312 (e.g., Dynamic Random Access Memory—DRAM) is larger and slower than the L-3 cache 310, and the non-volatile memory 304 (e.g., a hard drive) is larger and slower than the system memory. Nonetheless, a request for data continues down the memory hierarchy 300 until the data is found. When the data is found, it is then loaded into the highest available level of memory (i.e., L-1 cache 306). Populating the L-1 cache 306 or the L-2 or lower caches (308, 310) with needed data is known as "warming up" the cache.

Figure 4:
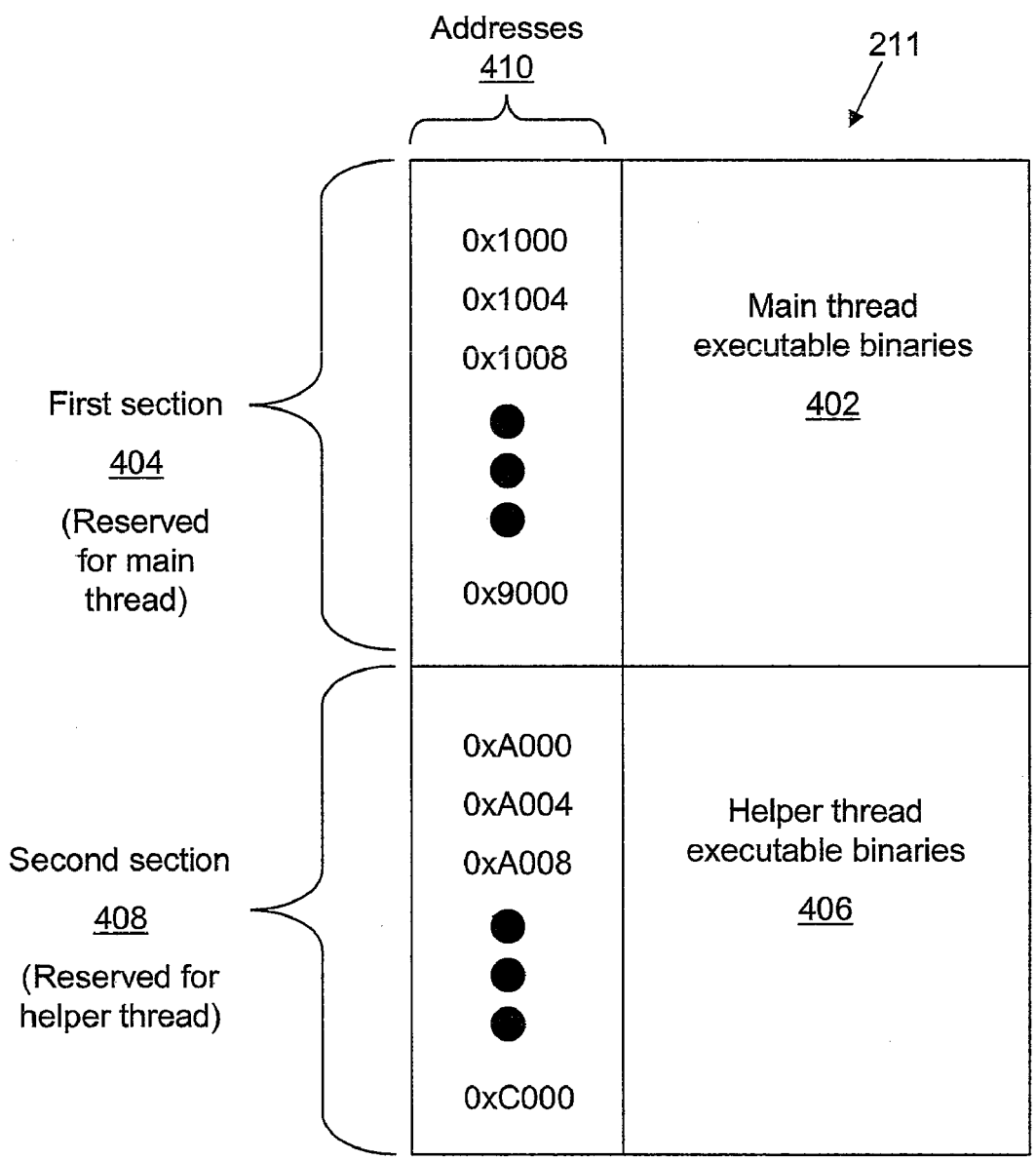
FIG. 4 depicts a set of main thread binaries and a set of helper thread binaries as they are mapped to the region of memory reserved for the application's code space.
Figure 5:
FIG. 5 illustrates an exemplary set of operations performed by a main thread and an associated exemplary set of operations performed by a helper thread.

With reference now to FIG. 4, additional detail of the application's code space 211 is presented. As discussed above, the application's executable binaries are created when the operating system uses a linker to convert object code into executable binaries. In accordance with the present invention, the operating system or linker converts the object code into two sets of binaries: main thread executable binaries and helper thread executable binaries. The main thread executable binaries make up a complete set of executable instructions for the application's object code. The helper thread executable binaries are an altered set of the main thread executable binaries. For example, consider the main thread executable binaries 402 and helper thread executable binaries 406 shown in exemplary form in FIG. 5. Assume that the main thread executable binaries 402 are from a main thread for handling an order from an array of customer orders. Assume also that the operations described in FIG. 5 are actually executable microprocessor instructions, but are illustrated in FIG. 5 in human-readable words (which correlate with the actual binaries). As shown in the example, both the main thread executable binaries 402 and the helper thread executable binaries 406 include instructions to retrieve the address of the customer ("Read customer address"), to read which items the customer ordered ("Read item") and the number of items ("Read quantity"). The helper thread executable binaries 406 have a copy of these instructions as well, since they do not require any computational operations, but rather are dedicated only to reading data in an independent manner. However, the instructions to "Compute S/H for item", "Compute subtotal" and "Computer total" for the customer's order are replaced with no-operation (NOOP) instructions, since these operations are data dependent (depend on complex data manipulations or intermediate results). Recognizing the "Compute subtotal" and "Compute total" instructions as being data dependent, the OS or linker that is controlling the generation of the helper thread executable binaries 406 has thus replaced these instructions with NOOP instructions.

Similarly, if a helper thread instruction requires the completion of a previous instruction or instructions in the main thread executable binaries 402, then the OS may inject new code in the helper thread executable binaries 406. As shown in exemplary manner, the set of code that discounts the shipping and handling charge ("Discount S/H charge") only occurs if the total cost of an order exceeds $300 ("If Total>$300"). The OS may inject code to wait (until the total charge is calculated by the main thread) or speculate (guess) that the cost will be more or less than $300 (based on historical factors, the type of order, the average cost of orders, etc.). As shown, both the main thread and the helper thread include instructions to "Read payment source," since this is another type of data independent load/store operation.

Returning again to FIG. 4, note that the application's code space 211 has been reserved into two sections. The first section 404 is reserved for the complete set of main thread executable binaries 402), while the second section 408 is reserved for the helper thread executable binaries 406. Note that, in one embodiment, the first section 404 and the second section 408 do not overlap, which results in a simpler implementation. Note also that the two sections may be reserved for the exclusive use of either the main thread or the helper thread. In one embodiment, the second section 408 is shorter than the first section 404, due to the removal of the NOOP instructions. The different lengths of the respective sections may be arbitrarily preset (based on historical experience regarding how much shorter the altered helper thread is compared to the main thread), or the different lengths may be dynamically assigned according to how many operations have been removed from the main thread executable binaries to create the helper thread executable binaries.

Figure 6:
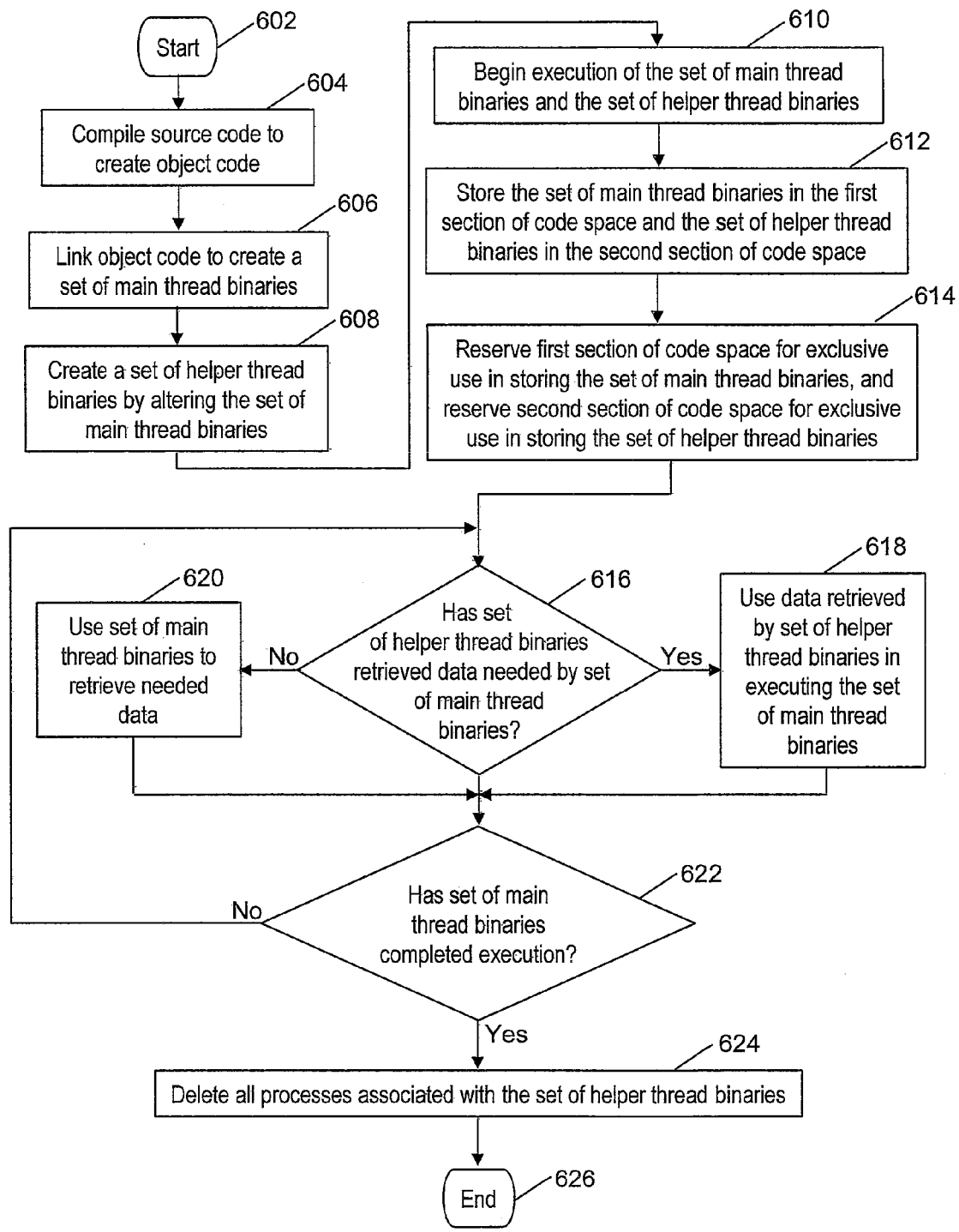
FIG. 6 is a high-level logical flowchart of an exemplary set of steps performed to create and utilize helper thread binaries in accordance with the present invention.

With reference now to FIG. 6, a high-level flow-chart of exemplary steps taken to create and utilize helper thread binaries (helper thread executable binaries) that are created from main thread binaries (main thread executable binaries) is presented. After initiator block 602, source code for the application is compiled to create object code for the main thread (block 604). The compiled object code is then run through a linker to create main thread binaries (block 606). In addition, the OS makes a modified copy of the main thread binaries to create helper thread binaries (block 608). As described above, this alteration preferably includes deleting any instruction that is data dependent, either by calling data from another location, or being dependent on data from a previous operation. Thus, the OS can remove any operation such as "SUM", "COMPARE", etc., which require more than simple load/store operations to and from cache/registers. The process also removes any operations that store intermediate or final results.

When loading the program, the code space is partitioned into a first section for the main thread binaries and a second section for the helper thread binaries (block 610). The main thread binaries are then stored in the first section and the helper thread binaries are stored in the second section (block 612).

Execution of the main thread binaries and the helper thread binaries then begins (block 614). Because the helper thread binaries contain only instructions for retrieving data, the helper thread binaries are able to "get ahead" of the main thread binaries, when running in a modern superscalar processor. Since data addresses are identical for both main thread and helper thread, any data fetched by the helper thread is placed in the data cache 230 and directly accessible by the main thread. During the execution of instructions in the main thread, conventional logic in the data cache controller is able to detect if data is available (query block 616). If so, then the main thread binaries use that pre-retrieved data (which should be in the D-cache or another high-level of memory), as described in block 618. Otherwise, the main thread binaries pull their own data (block 620). If the main thread binaries have completed execution (query block 622), then all processes within the helper thread binaries are deleted (block 624). This is one of the unique features of the inventive helper thread binaries, since normal threads wait as long as necessary for their turn to execute. In the present invention, however, the helper thread binaries are only viable as long as the main thread binaries are running. When the main thread binaries complete, then the helper thread binaries may be deleted from memory, and all registers and other buffers containing data generated by the helper thread binaries may be flushed out. The process ends at terminator block 626.

Although aspects of the present invention have been described with respect to a computer processor and software, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to preferred embodiments thereof, it will be apparent that modifications and variations are possible without departing from the scope of the invention defined in the appended claims.

What is claimed is:

1. A method of retrieving data for use by a process thread, the method comprising:
   receiving object code for a process thread, wherein the object code is created by compiling source code for the process thread;
   linking the object code with a linker to create a set of main thread binaries;
   creating a set of helper thread binaries by copying and altering the set of main thread binaries, wherein altering the set of helper thread binaries includes removing every binary operation within the helper thread binaries that stores intermediate results or final results;
   every binary operation within the helper thread binaries that is dependent on data from a previous operation; and
   every data dependent binary operation within the helper thread binaries that calls data from another location;
   executing the set of main thread binaries and the set of helper thread binaries;
   in response to determining that the set of helper thread binaries has retrieved necessary data that is needed by an operation in the set of main thread binaries, utilizing the necessary data in an execution of the operation in the set of main thread binaries.

2. The method of claim 1, wherein the set of main thread binaries is altered to create the set of helper thread binaries by replacing a data-dependent operation in the set of main thread binaries with a no-operation (NOOP) command, wherein a data dependent operation is an operation that depends on one of a complex data manipulations or intermediate results.

3. The method of claim 1, wherein the set of main thread binaries is altered to create the set of helper thread binaries by replacing a store operation in the set of main thread binaries with a no-operation (NOOP) command.

4. The method of claim 1, wherein the set of main thread binaries is altered to create the set of helper thread binaries by replacing a data-dependent operation in the set of main thread binaries with a speculate command that creates speculative data, which is used in the data-dependent operation.

5. The method of claim 1, wherein the set of main thread binaries is altered to create the set of helper thread binaries by replacing a data-dependent operation in the set of main thread binaries with a wait command that suspends execution of the set of helper thread binaries until the data-dependent operation, in the set of main thread binaries, completes execution.

6. The method of claim 1, further comprising:
reserving a first section of code space for exclusive use by the set of main thread binaries;
reserving a second section of the code space for exclusive use by the set of helper thread binaries;
storing the set of main thread binaries in the first section of the code space; and
storing the set of helper thread binaries in the second section of the code space.

7. The method of claim 6, further comprising:
in response to determining that the set of main thread binaries has completed execution, deleting the set of helper thread binaries from memory.

8. The method of claim 1, wherein the set of main thread binaries executes in a first execution unit (EU) in a processor core, and wherein the set of helper thread binaries executes in a second EU in said processor core.

9. A system comprising:
a processor;
a data bus coupled to the processor;
a memory coupled to the data bus; and
computer program code-that includes instructions executable by the processor to retrieve data for use by a process thread, wherein the instructions when executed cause the processor to:
compile source code for a process thread to create object code for the process thread;
link the object code with a linker to create a set of main thread binaries;
create a set of helper thread binaries by copying and altering the set of main thread binaries, wherein altering the set of helper thread binaries includes removing every binary operation within the helper thread binaries that stores intermediate results or final results;
every binary operation within the helper thread binaries that is dependent on data from a previous operation; and
every data dependent binary operation within the helper thread binaries that calls data from another location;
reserve a first section of code space for exclusive use by the set of main thread binaries;
reserve a second section of the code space for exclusive use by the set of helper thread binaries;
store the set of main thread binaries in the first section of the code space;
store the set of helper thread binaries in the second section of the code space;
execute the set of main thread binaries and the set of helper thread binaries;
wherein the set of main thread binaries executes in a first execution unit (EU) in a processor core, and wherein the set of helper thread binaries executes in a second EU in a same processor core;
in response to determining that the set of helper thread binaries has retrieved necessary data that is needed by an operation in the set of main thread binaries, utilize the necessary data in an execution of the operation in the set of main thread binaries; and
in response to determining that the set of main thread binaries has completed execution, delete the set of helper thread binaries from memory.

10. The system of claim 9, wherein the set of main thread binaries is altered to create the set of helper thread binaries by replacing a data-dependent operation in the set of main thread binaries with one of a no-operation (NOOP) command; a speculate command that creates speculative data, which is used in the data-dependent operation; and a wait command that suspends execution of the set of helper thread binaries until the data-dependent operation, in the set of main thread binaries, completes execution.

11. The system of claim 9, wherein the set of main thread binaries is altered to create the set of helper thread binaries by replacing a store operation in the set of main thread binaries with a no-operation (NOOP) command.

12. A computer-readable storage device having a plurality of instructions processable by a machine embodied therein, wherein said plurality of instructions, when processed by said machine, causes said machine to perform functions comprising:
compiling source code for a process thread to create object code for the process thread;
linking the object code with a linker to create a set of main thread binaries;
creating a set of helper thread binaries by copying and altering the set of main thread binaries, wherein altering the set of helper thread binaries includes removing every binary operation within the helper thread binaries that stores intermediate results or final results;
every binary operation within the helper thread binaries that is dependent on data from a previous operation; and
every data dependent binary operation within the helper thread binaries that calls data from another location;
executing the set of main thread binaries and the set of helper thread binaries; and
in response to determining that the set of helper thread binaries has retrieved necessary data that is needed by an operation in the set of main thread binaries, utilizing the necessary data in an execution of the operation in the set of main thread binaries.

13. The computer-readable storage device of claim 12, wherein the set of main thread binaries is altered to create the set of helper thread binaries by replacing a data-dependent operation in the set of main thread binaries with a no-operation (NOOP) command.

14. The computer-readable storage device of claim 12, wherein the set of main thread binaries is altered to create the set of helper thread binaries by replacing a data-dependent operation in the set of main thread binaries with a speculate command that creates speculative data, which is used in the data-dependent operation.

15. The computer-readable storage device of claim 12, wherein the set of main thread binaries is altered to create the set of helper thread binaries by replacing a data-dependent operation in the set of main thread binaries with a wait command that suspends execution of the set of helper thread binaries until the data-dependent operation, in the set of main thread binaries, completes execution.

16. The computer-readable storage device of claim 12, wherein the plurality of instructions are further configured to cause the machine to perform additional functions of:
   reserving a first section of the code space for exclusive use by the set of main thread binaries;
   reserving a second section of the code space for exclusive use by the set of helper thread binaries;
   storing the set of main thread binaries in the first section of the code space; and
   storing the set of helper thread binaries in the second section of the code space.

17. The computer-readable storage device of claim 16, wherein the plurality of instructions are further configured to cause the machine to perform the function of deleting the set of helper thread binaries from memory in response to determining that the set of main thread binaries has completed execution.

18. The computer-readable storage device of claim 12, wherein the set of main thread binaries executes in a first execution unit (EU) in a processor core, and wherein the set of helper thread binaries executes in a second EU in a same processor core.

* * * * *